Dec. 9, 1969 D. M. SWALLOW Re. 26,736

SELF-CLEANING SCREEN STRUCTURE FOR VIBRATORY SEPARATORS

Original Filed Jan. 21, 1965 2 Sheets-Sheet 1

INVENTOR.
DOUGLAS M. SWALLOW
BY Lyon & Lyon
ATTORNEYS

SELF-CLEANING SCREEN STRUCTURE FOR VIBRATORY SEPARATORS

Original Filed Jan. 21, 1965 2 Sheets-Sheet 2

INVENTOR.
DOUGLAS M. SWALLOW
BY Lyon & Lyon
ATTORNEYS

United States Patent Office

Re. 26,736
Reissued Dec. 9, 1969

26,736

SELF-CLEANING SCREEN STRUCTURE FOR VIBRATORY SEPARATORS

Douglas M. Swallow, Burlington, Ontario, Canada, assignor to Southwestern Engineering Company, Los Angeles, Calif., a corporation of California Original No. 3,366,239, dated Jan. 30, 1968, Ser. No. 426,977, Jan. 21, 1965. Application for reissue Aug. 26, 1968, Ser. No. 793,199

Int. Cl. B07b *1/50, 1/38*

U.S. Cl. 209—332 5 Claims

Matter enclosed in heavy brackets [ ] appears in the original patent but forms no part of this reissue specification; matter printed in italics indicates the additions made by reissue.

*ABSTRACT OF THE DISCLOSURE*

*A vibratory separator having a self-cleaning screen structure. An upper separating screen and lower supporting screen are disposed in parallel relation, and a multiplicity of cleaning elements are disposed between the screens and supported on the lower screen. When resting on the lower screen, the upper ends of the cleaning elements are displaced from but in close proximity to the separating screen. The upper ends of the cleaning elements serve to strike and wipe against the under portion of the separating screen for cleaning therefrom material which clings to the separating screen. Various structures and configurations for the cleaning elements are disclosed, and it is preferred that they are perforated and present an open area approximately the same as or greater than the separating screen to provide minimum obstruction to flow of material through the screens.*

This invention relates to self cleaning screen structures for vibratory separators, that is, to screen structures particularly adapted for the screening of materials which tend to seal or blind conventional separator screens. Included in the objects of this invention are:

First, to provide a self-cleaning screen structure wherein a plurality of cleaning elements are retained by a supporting screen under a separating screen, the cleaning elements having flat upper and lower end surfaces and are so oriented and retained between the screens that their upper end surfaces are caused to impact flatwise against the underside of the separating screen as the screen structure is vibrated.

Second, to provide a self-cleaning screen structure as set forth in the preceding object, which is particularly adapted for incorporation in a vibratory separator of the type employing a circular screen, and wherein vibratory movement of the separator causes the cleaning elements to precess in a circular path about the separating screen whereby the flat ends thereof move laterally as well as vertically against the separating screen and tend to shear material which may cling to the underside of the separating screen.

Third, to provide a self-cleaning screen structure, which, while particularly adapted for circular screen type of separators, is also adapted for use in conjunction with separators of the rectangular type.

Fourth, to provide a self-cleaning screen structure as set forth in the preceding objects, wherein the cleaning elements are of uniform cross section between their flat end surfaces and mutually support each other to maintain their orientation between the screens.

Fifth, to provide a self-cleaning screen structure wherein certain embodiments of the cleaning elements are of uniform cross section and have lateral dimensions exceeding the spacing between the separating and supporting screens whereby the screens maintain the cleaning elements in predetermined orientation.

Sixth, to provide a self-cleaning screen structure wherein an embodiment thereof utilizes circular cleaning elements of various diameters, some of the smaller cleaning elements being positioned within larger cleaning elements for gyratory movement therein.

Seventh, to provide a self-cleaning screen structure wherein an embodiment thereof utilizes interlocking cleaning elements of uniform cross section so arranged that the cleaning elements are retained against radial separation, but are free to move axially relative to each other.

With the above and other objects in view, as may appear hereinafter, reference is directed to the accompanying drawings in which.

Figure 3:
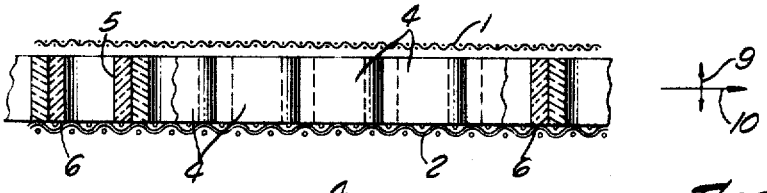
FIGURE 3 is an enlarged fragmentary sectional view taken through 3—3 of FIGURE 1 showing some of the cleaning elements in section and others in elevation.
Figure 2:
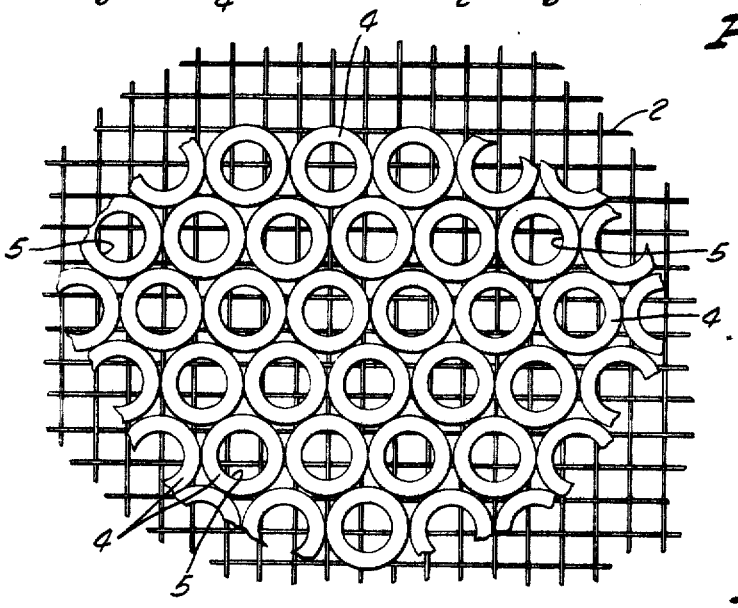
FIGURE 2 is an enlarged fragmentary view thereof with the upper or separating screen removed and showing one form of the cleaning elements, the view being taken within circle 2 of FIGURE 1.
Figure 1:
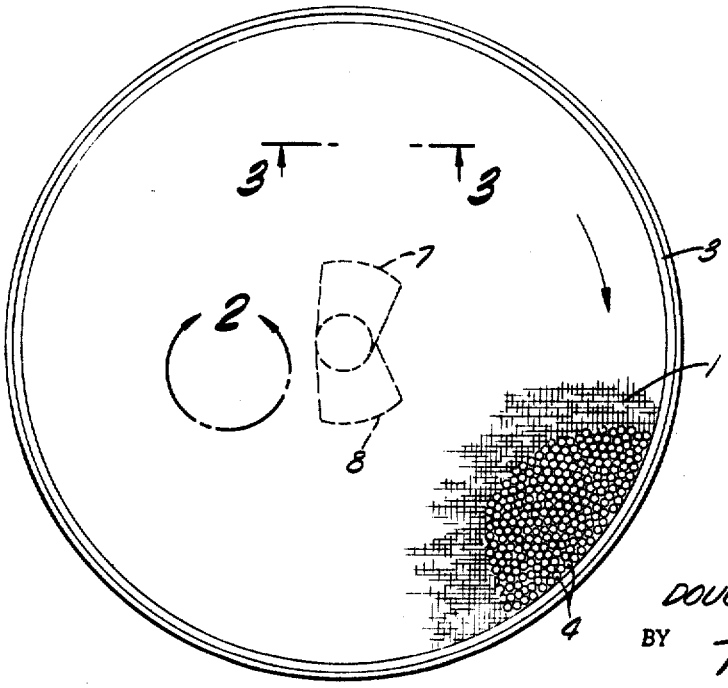
FIGURE 1 is a top view of the self-cleaning screen structure with a portion of the upper screen removed and indicating by broken lines a vibrator unit disposed below the screen.

Reference is first directed to FIGURES 1 through 4. The self cleaning screen structure includes an upper separating screen 1 and a lower supporting screen 2, which is of larger mesh than the separating screen. The screens are held in parallel relation by a surrounding rim 3. In the construction illustrated, the rim shown is circular, but may be rectangular.

Interposed between the screens 1 and 2 is a multiplicity of cleaning elements 4. The cleaning elements shown in FIGURES 2 and 3 particularly, are in the form of hollow circular cylinders each having a central perforation 5. The cleaning elements are uniform in cross section and have flat ends 6.

The cleaning elements may be formed of various materials depending upon the conditions of operation. They may be formed of ceramic material, plastic material or metal. The density of the cleaning elements may differ depending on the conditions of operation.

It is preferred that the cleaning elements substantially fill the space between the screens so that if they are small in diameter compared to the space between the screens, they will by mutual contact, be maintained with their axes in perpendicular relation with the screen. It will be noted further that when the cleaning elements rest on the lower screen, their upper ends are in relatively close proximity or confronting relation with the upper screen. This distance is materially less than the axial length of the cleaning elements.

The cleaning elements may be solid cylinders; however, it is preferred to use hollow cylinders for the reason that the cumulative open area between and within the cleaning elements should approximate the open area of the separating screen 1 and may be greater than the open area of the separating screen so that the cleaning elements themselves provide minimum obstruction to flow of material through the screens. It is preferred to use a supporting screen having large mesh not only to provide a minimal obstrution, but also to withstand the wear imposed by the cleaning elements.

The self cleaning screen structure herein described is particularly adapted for use in the type of vibratory circular separator shown in the series of Miller et al. Patents, 2,696,302, 2,753,999, 2,777,578, and 2,714,961, the McCausland Patent 3,035,700 and the Wright, Jr., et al. Patent 3,029,946 as well as the type of vibratory separator shown in the copending patent application Ser. No. 426,908, filed Jan. 21, 1965. These types of separators employ at least one circular separating screen and if additional separator screens are used, they are stacked coaxially. These types of sparators employ a vibrator involving axially spaced and circumferentially displaced eccentric weights 7 and 6 which rotate around the vertical axis of the separating screen or screens. As more fully brought out in the aforementioned patents and application, the eccentric weights produce gyratory vibrations which make possible effective separation of components of material disposed on the separating screen or screens. The material is not only vibrated by the screen or screens, but is moved in spiral paths, either radially outward or radially inward on the separating screen or screens. Stated otherwise, the material precesses circumferentially on the screen.

Operation of the self-cleaning screen is as follows:

When the screens 1 and 2 and the cleaning elements 4 are subjected to the gyratory vibrations produced by the eccentric weights, the cleaning elements vibrate between the screens as indicated by the vertical vector 9 indicated at one side of FIGURE 3 so that the flat upper side strikes essentially flatwise against the upper screen; that is, there is surface contact rather than line contact with the upper screen. This imparts a vigorous movement to the upper screen which tends to work material which might otherwise clog the screen upwardly out of the interstices of the screen.

In addition, the gyratory vibration produced by the eccentric wegihts, produces a horizontal component of movement reproduced by the horizontal vector 10 indicated in FIGURE 3 causing the cleaning elements to process as a mass producing a lateral sliding movement of the flat upper surfaces of the cleaning elements. This lateral movement appears to be extremely effective if a component of the material being separated is greasy or fibrous, for there appears to occur a shearing action between the edges of the flat surface of the cleaning elements and the under surface of the separating screen. Thus, for the separation of some materials, essentially vertical travel of the cleaning elements produces the desired result, whereas with other material, the shearing action resulting from the precession or lateral movement of the cleaning elements is most effective.

As indicated previously, the cleaning elements may be maintained in their vertical orientation by mutual support, and in the case, it should be noted that while it is preferred to have all of the cleaning elements so oriented, improved operation is obtained if the majority of the elements are so oriented.

Figure 4:
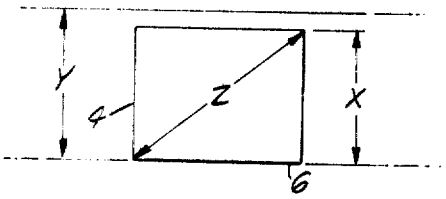
FIGURE 4 is a diagrammatical view indicating the spatial relationship of the cleaning elements and the screens.

It is preferred, however, to so dimension the cleaning elements that they are retained in a vertical orientation by the two screens. Thus, as shown in FIGURE 4, it is preferred that the diagonal dimension Z be greater than the distance Y between the two screens, taking into account the excursion of the screens due to their vibration. Stated otherwise, the vertical heights of the cleaning elements are preferably only slightly less than the distance Y between the screens.

Figure 5:
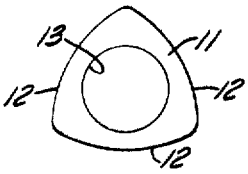
FIGURES 5, 6 and 7 are end views of modified forms of single cleaning elements.

The transverse shape of the cleaning elements may vary substantially. For example, the cleaning elements may be triangular as indicated by 11 in FIGURE 5 and provided with convex sides 12 and a central perforation 13 so that the cleaning elements provide a large percentage of open area.

Figure 6:
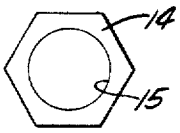

Alternatively, the cleaning elements may be hexagonal as indicated by 14 in FIGURE 6 and again provided with a central perforation 15. Due to the interesting characteristic of the hexagonal shape, the central perforations of the cleaning elements must be larger than in the previous embodiments or the density of the cleaning elements reduced.

Figure 7:
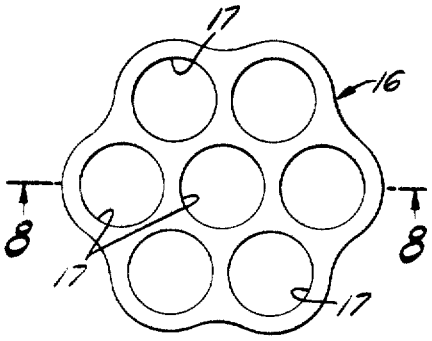
Figure 8:
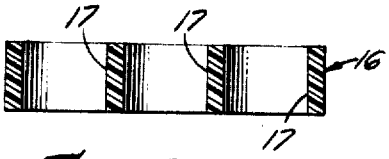
FIGURE 8 is a transverse sectional view through 8—8 of FIGURE 7.

It is also feasible in some instances to utilize cleaning elements of relatively large diameter such as the rosette shaped elements 16 shown in FIGURES 7 and 8. In this case, each cleaning element is provided with a plurality of perforations 17.

Figure 9:
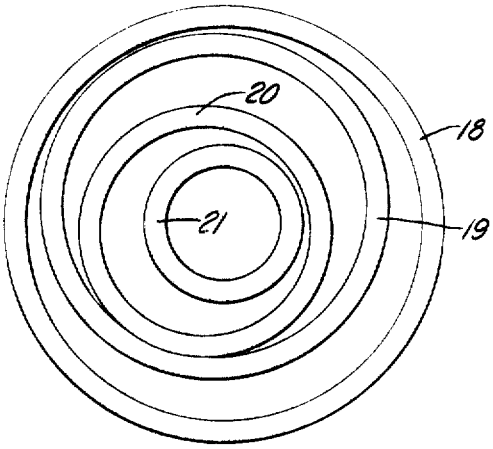
FIGURE 9 is a plan view of a modified form of cleaning involving a plurality of nested rings.

A still further arrangement is to form the cleaning elements of a nesting set of rings 18, 19, 20 and 21 as shown in FIGURE 9. This arrangement is particularly advantageous for use in conjunction with rectangular screens vibrated by eccentric weights arranged about a horizontal axis, as the smaller rings within and between the larger rings tend to orbit even though the mass of rings as a whole do not precess.

Figure 10:
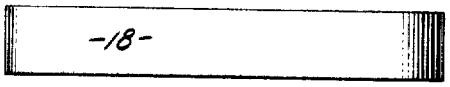
FIGURE 10 is a side view thereof.

The arrangement shown in FIGURES 9 and 10 illustrates another feature which aids in the cleaning action of the cleaning elements. That is, the rings have different masses and therefore tend to vibrate at different frequencies, and in this case, it should be noted that the other embodiments of the cleaning elements need not be of uniform dimension or mass.

Figure 11:
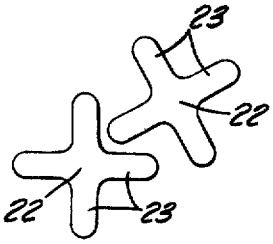
FIGURE 11 is an end view showing a pair of further modified cleaning elements.

Still further, the cleaning elements may be cross shaped as indicated by 22 in FIGURE 11; that is, may have radiating spokes or ribs 23, which need not be limited to four, but involve three or more spokes. Still further, as indicated in FIGURE 12, the cleaning elements may include spokes 24 terminating in laterally directed interlocking flanges 25; that is, the cleaning elements may be so arranged so as to be joined together and restrained against relative lateral or radial displacement, but remain free to vibrate axially.

Figure 12:
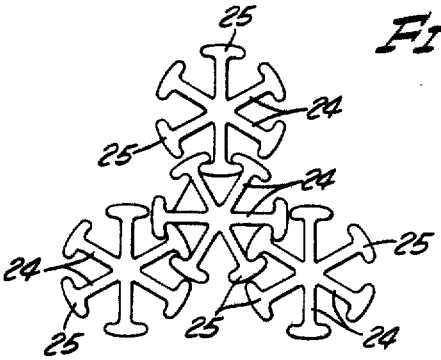
FIGURE 12 is an end view showing several still further modified forms of cleaning elements.

In the arrangement illustrated in FIGURE 12, the cumulative end surfaces of the cleaning elements may be minimized by defining relatively large openings between groups of cleaning elements; that is, if the pattern indicated in FIGURE 12 is expanded, hexagonal patterns with large central openings are formed. In addition, the linear extent of the edges of the cleaning elements is increased so as to enhance the shearing action when the cleaning elements are caused to move laterally as well as to vibrate vertically.

[While particularly embodiments of this invention have been shown and described, it is not intended to limit the same to the details of the construction set forth, but instead, the invention embraces such changes, modifications and equivalents of the various parts and their relationships as come within the purview of the appended claims.]

I claim:

1. A self-cleaning screen structure for vibratory separators, comprising: an upper separating screen adapted to receive thereon material to be screened; a lower supporting screen of relatively greater mesh size than said upper screen and disposed in parallel relation therewith; and a multiplicity of cleaning elements disposed between said screens and occupying the major portion of the distance therebetween, said cleaning elements being of uniform cross section and having flat ends confronting said screens such that said cleaning elements are movable both perpendicular and parallel to said screens and when in motion move laterally and vertically against said upper screen to shear material which clings to the underside of said screen when said vibratory separator is in operation; said cleaning elements having lateral dimensions exceeding the distance between said screens whereby said screens maintain said cleaning elements oriented with their vertical axes perpendicular to said screens and said cleaning elements having the form of rings of graded diameters with the rings of small diameter dimensioned to nest loosely with the rings of larger diameter.

2. A self-cleaning screen structure for vibratory separators, comprising: an upper separating screen adapted to receive thereon material to be screened; a lower supporting screen of relatively greater mesh size than said upper screen and disposed in parallel relation therewith; and a multiplicity of cleaning elements disposed between said screens and occupying the major portion of the distance therebetween, said cleaning elements being of uniform cross section and having flat ends confronting said screens such that said cleaning elements are movable both perpendicular and parallel to said screens and when in motion move laterally and vertically against said upper screen to shear material which clings to the underside of said screen when said vibratory separator is in operation; said cleaning elements including radiating spokes having lateral enlargements dimensioned to interlock with adjacent cleaning elements against relative radial displacement, said cleaning elements being relatively movable both vertically and horizontally.

3. A self-cleaning vibratory separator, comprising: an upper separating screen adapted to receive thereon material to be screened; a lower supporting screen of relatively greater mesh size than said upper screen and disposed in parallel relation therewith; a multiplicity of cleaning elements disposed between said screens, said cleaning elements being uniform in cross section and having flat ends; each of said cleaning elements, when resting by one end on said supporting screen, presenting its other end in close proximity to said separating screen; the dimensions of said cleaning elements and the spacing between said screens being such that said cleaning elements are restrained to a position with their flat ends essentially parallel to said screens; and means for causing gyratory vibration of said screens thereby to cause a component of said material to pass through said separating screen, and the remaining component to move spirally on said separating screen, said gyratory vibration means also causing said cleaning elements to vibrate vertically and spirally between said screens thereby causing the flat upper ends of said cleaning elements to strike and wipe against the under portion of said separating screen, said cleaning elements being rings of graded diameters, the rings of smaller diameter being dimensioned to nest loosely within the rings of larger diameter.

4. A self-cleaning vibratory separator comprising: an upper separating screen adapted to receive thereon material to be screened; a lower supporting screen of relatively greater mesh size than said upper screen and disposed in parallel relation therewith; a multiplicity of cleaning elements disposed between said screens, said cleaning elements being uniform in cross section and having flat ends; each of said cleaning elements, when resting by one end on said supporting screen, presenting its other end in close proximity to said separating screen; the dimensions of said cleaning elements and the spacing between said screens being such that said cleaning elements are restrained to a position with their flat ends essentially parallel to said screens; and means for causing gyratory vibration of said screens thereby to cause a component of said material to pass through said separating screen, and the remaining component to move spirally on said separating screen, said gyratory vibration means also causing said cleaning elements to vibrate vertically and spirally between said screens thereby causing that flat upper end of said cleaning elements to strike and wipe against the under portion of said separating screen, said cleaning elements including means for interlocking engagement with adjacent cleaning elements for restraining said cleaning elements against radial separation but permitting both perpendicular and parallel movement so said cleaning elements with respect to said screens.

5. A self-cleaning vibratory separator, comprising: an upper separating screen adapted to receive thereon material to be screened; a lower supporting screen of relatively greater mesh size than said upper screen and disposed in parallel relation therewith; a multiplicity of cleaning elements disposed between said screens, said cleaning elements being uniform in cross section and having flat ends; each of said cleaning elements, when resting by one end on said supporting screen, presenting its other end displaced from but in close proximity to said separating screen; the dimensions of said cleaning element and the spacing between said screens being such that said cleaning elements are restrained to a position with their flat ends essentially parallel to said screens; and means, including axially spaced and circumferentially displaced eccentric weights which [rotote] *rotate* around the vertical axis of said screens, for causing gyratory vibration of said screens thereby to cause a component of said material to pass through said separating screen, and the remaining component to move spirally on said separating screen, said gyratory vibratory means also causing said cleaning elements to vibrate vertically and spirally between said screens thereby causing the flat upper ends of said cleaning elements to strike and wipe against the under portion of said separating screen, said cleaning elements being in the form of hollow cylinders so as to present to said screens a cumulative open area within and between said cleaning elements *at least* approximating the cumulative open area of said separating screen.

References Cited

The following references, cited by the Examiner, are of record in the patented file of this patent or the original patent.

UNITED STATES PATENTS

| | | | |
|---|---|---|---|
| 961,414 | 6/1910 | Kinsey | 209—387 |
| 979,685 | 12/1910 | Mumford | 209—385 X |
| 1,572,112 | 2/1926 | Forgeson | 209—323 |
| 1,925,447 | 9/1933 | Keefer | 209—323 |

FOREIGN PATENTS 650,578 12/1962 Canada.

HARRY B. THORNTON, Primary Examiner

ROBERT HALPER, Assistant Examiner

U.S. Cl. X.R.

209—382, 385